US006823265B2

(12) United States Patent
Haldorsen

(10) Patent No.: US 6,823,265 B2
(45) Date of Patent: Nov. 23, 2004

(54) MULTI-COMPONENT SEISMIC MWD DATA PROCESSING METHOD

(75) Inventor: Jakob B. U. Haldorsen, Norwalk, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/323,366

(22) Filed: Dec. 19, 2002

(65) Prior Publication Data

US 2004/0122593 A1 Jun. 24, 2004

(51) Int. Cl.⁷ ................................................ G06F 3/16
(52) U.S. Cl. ........................... 702/9; 702/57; 702/182; 702/188; 702/189
(58) Field of Search ........................... 702/9, 57, 150, 702/171, 182, 188, 189, 14, 33, 41, 151; 367/25; 340/853.2, 853.54; 701/29

(56) References Cited

U.S. PATENT DOCUMENTS

| 5,585,556 | A | | 12/1996 | Petersen et al. ......... 73/152.03 |
| 5,678,643 | A | * | 10/1997 | Robbins et al. ............... 175/45 |
| 5,835,452 | A | * | 11/1998 | Mueller et al. ................ 367/75 |
| 6,308,137 | B1 | | 10/2001 | Underhill et al. ............... 702/9 |
| 2003/0058125 | A1 | * | 3/2003 | Ciglenec et al. ......... 340/853.1 |
| 2003/0179651 | A1 | * | 9/2003 | Nutt et al. ..................... 367/25 |

OTHER PUBLICATIONS

Colorado School of Mines, "Repeat Acquisition of VSP and Walk–away VSP". *Reservoir Characterization Project, Phase VII—Apr. 15–16, 1999, Sponsor Meeting Report,* Chapter 11.

Colorado School of Mines "Time–Lapse, Multi–Component Analysis of the Reservoir Interval". *RCP Phase VII, Spring 2000 Report,* Chapter 2.

Li, X–Y. "Fractured Reservoir Delineation Using Multicomponent Seismic Data". *Geophysical Prospecting* (1997), vol. 45, pp–39–64.

Roche, S. L. et al. "An Onshore Time–Lapse (4–D), Multicomponent, Data Processing Case History, Vacuum Field, New Mexico". *SEG Expanded Abstracts* (1998).

* cited by examiner

*Primary Examiner*—Marc S. Hoff
*Assistant Examiner*—Felix Suarez
(74) *Attorney, Agent, or Firm*—William B. Batzeer; John J. Ryberg

(57) ABSTRACT

A method of processing multi-component seismic measurement-while-drilling data that includes rotating the data to align energy in the data along a common axis and then combining the data. Another embodiment of the inventive method involves a technique for estimating the orientations and/or change in orientation of a bottom hole assembly associated with two or more series of multi-component seismic MWD data acquired at different times at the same source and receiver locations. Embodiments of the inventive method may be used to improve the signal to noise ratio of the data, to reduce downhole storage and transmission requirements, and to improve direct arrival time picks made using the data.

15 Claims, 6 Drawing Sheets

MULTI-COMPONENT SEISMIC MWD DATA PROCESSING METHOD

FIELD OF THE INVENTION

The present invention relates to a method of processing seismic measurement-while-drilling (MWD) data and, more particularly, to a method of processing multi-component seismic measurement-while-drilling data.

BACKGROUND OF THE INVENTION

Measurement-while-drilling involves the sensing of one or more downhole parameters during the drilling process. Sensors, typically mounted within drill collars located above the drill bit, are used to obtain information regarding the drilling process or subsurface conditions and a subset of these measurements may be transmitted to the surface, often using an acoustic or "mud pulse" telemetry system. Other measurements may be stored in recording devices located within the drill collars and this data can be retrieved when the drill bit is raised (also called "tripped") to the surface.

Seismic measurement-while-drilling data is acquired using seismic sensors, such as geophones or hydrophones that are typically located within a drill collar positioned above the drill bit. This type of equipment is described, for instance, in U.S. Pat. No. 5,585,556 and commonly assigned U.S. Pat. No. 6,308,137. In one multi-component embodiment of this type of equipment, three mutually orthogonal fixed axis geophones and a hydrophone are located in a drill collar. In this embodiment, one geophone may be oriented parallel to the longitudinal axis of the drill collar (referred to herein as the axially oriented geophone) and the other two geophones may be oriented perpendicular to each other in a plane that is perpendicular to this longitudinal axis (referred to herein as the first and second non-axially oriented geophones).

As the drill collar is not kept fixed by clamping during acquisition, it has been discovered that the drill collar can rotate around the axis of the well while multiple shots are being recorded at particular shot and receiver locations. One reason for making multiple recordings at a given combination of receiver and source location is to improve the signal-to-noise ratio of the data by stacking (i.e. by averaging or otherwise combining the data to attenuate random noise). When the drill collar has rotated during the acquisition of these multiple shots, it is clear that stacking the traces as they are acquired may not improve (and in fact may degrade) the quality of the data.

The use of software rotation techniques in the processing of multicomponent seismic data is known. See, for instance, "An Onshore Time-Lapse (4-D), Multicomponent, Data Processing Case History, Vacuum Field, New Mexico", 1998 SEG Expanded Abstracts; "Fractured Reservoir Delineation Using Multicomponent Seismic Data", Geophysical Prospective, 1997, 45,39–64; and the Colorado School of Mines, Reservoir Characterization Project, Phase VII Apr. 15–16, 1999 Sponsor Meeting Report (Chapter11) and Spring 2000. Report (Chapter 2)). While the use of these types of techniques is known, these techniques have not, heretofore, been used to align energy in multi-component seismic data along a common axis prior to a combining process such as stacking or to estimate the orientations and/or change in orientation of seismic sensors associated with two or more series of multi-component seismic MWD data acquired at different times at the same source and receiver locations.

Accordingly, it is an object of the present invention to provide an improved method of processing multi-component seismic measurement-while-drilling data.

SUMMARY OF THE INVENTION

One aspect of this invention involves a method of processing multi-component seismic measurement-while-drilling data that includes rotating the data to align energy in the data along a common axis and then combining the data. Another embodiment of the inventive method involves a technique for estimating the orientations and/or change in orientation of a bottom hole assembly associated with two or more series of multi-component seismic MWD data acquired at different times at the same source and receiver locations. Embodiments of the inventive method may be used to improve the signal to noise ratio of the data, to reduce downhole storage and transmission requirements, and to improve direct arrival time picks made using the data. Further features and applications of the present invention will be apparent from the figures and detailed description that follow.

DETAILED DESCRIPTION

Figure 1:
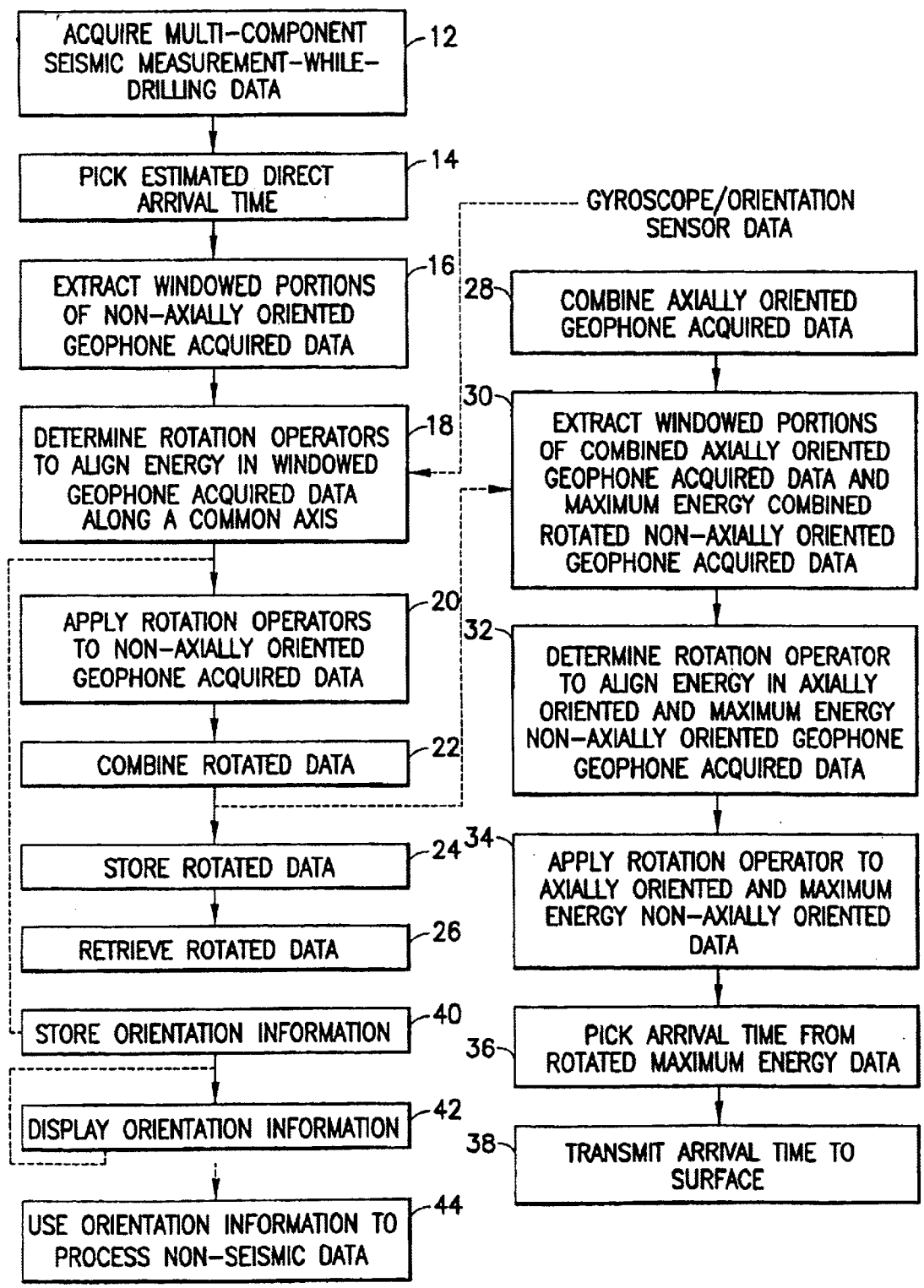
FIG. 1 is a flowchart illustrating processes associated with the inventive method.
Figure 2:
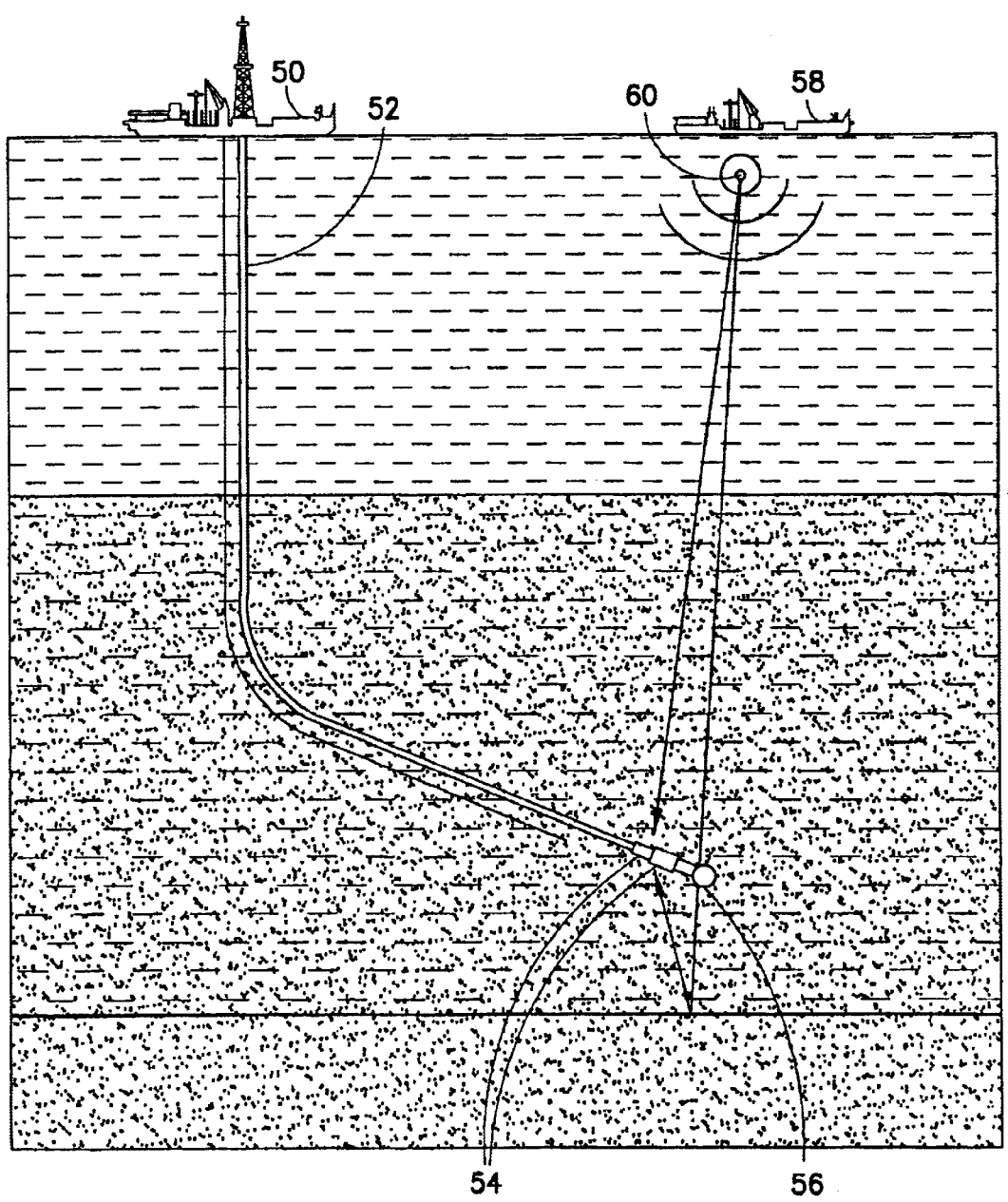
FIG. 2 is a schematic illustration of multi-component seismic measurement-while-drilling data acquisition equipment.

A flowchart illustrating processes associated with embodiments of the inventive method is shown in FIG. 1. The first process illustrated in FIG. 1 is Acquire Multi-Component Seismic MWD Data 12. The multi-component seismic MWD data may be acquired using the type of data acquisition equipment shown in FIG. 2. Shown in FIG. 2 is a Drill Ship 50 drilling a well using Drill String 52. Drill String 52 includes a pair of Drill Collars 54 and a Drill Bit 56. The Drill Collars 54, Drill Bit 56, and any other equipment positioned at the bottom of the Drill String 52 are known as the "bottom hole assembly". Also shown in FIG. 2 is a Source Vessel 58 towing a Seismic Source 60, such as an airgun.

Seismic MWD data is typically acquired while adding pipe to the Drill String 52, during which the Drill Bit 56 is raised a few meters from the bottom of the borehole and circulation of mud through the Drill String 52 is stopped. Seismic MWD data is often acquired by firing a series of shots while attempting to keep both the Drill Collar 54 containing the seismic receivers and the Seismic Source 60 stationary. As shown in FIG. 2, the seismic sensors in the Drill Collar 54 will receive both initial direct arrivals as well as later reflected arrivals, converted wave arrivals, etc. A subset of the received data (such as an estimated direct arrival time, often referred to as a "checkshot time") is typically transmitted uphole, often using a mud pulse data telemetry system. The multi-component seismic MWD data may also be stored using recording hardware in a Drill Collar 54 and the entire dataset may be downloaded when the drill bit is raised/tripped to the surface.

Drill Collar 54 may also contain other types of sensing or measuring equipment, such as electromagnetic, nuclear, nuclear magnetic resonance, or acoustic measuring devices. While some types of these devices have omni-directional fields of investigation (i.e. the measurements obtained do not depend on the orientations of the tools within the borehole), measurements obtained using many types of tools depend on the orientation of the tools within the borehole and knowledge of the tool orientation is required to properly process measurements obtained by the tools.

Figure 3:
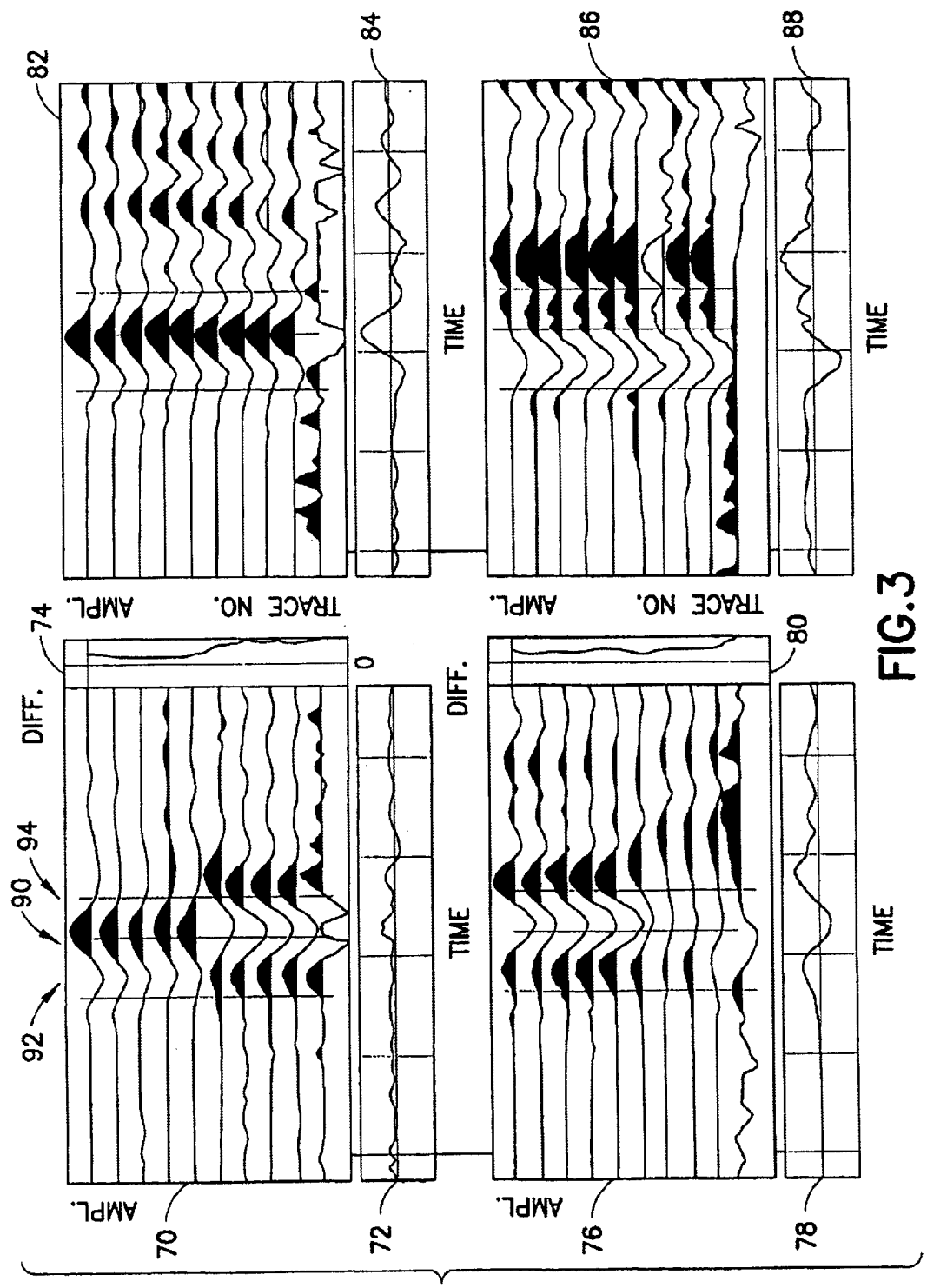
FIG. 3 displays example multi-component seismic measurement-while-drilling data.

FIG. 3 displays a selected subset of the type of multi-component seismic MWD data that may be acquired using this type of equipment. Data from a first non-axially oriented geophone is shown in First Panel 70. First Panel 70 displays an approximately 100-millisecond portion of ten traces acquired by the first non-axially oriented geophone. Below First Panel 70 is First Median Trace 72 that has been created by selecting, point-by-point, the median amplitudes for the group of traces in First Panel 70, at each sampling interval. For an even number of traces, the mean of the two middle values has been calculated. One way of reducing the influence of badly measured traces on this estimate is by first finding a preliminary median trace and then excluding traces that deviate more than a set amount from this preliminary median trace before finding the final median trace.

Immediately to the right of First Panel 70 is First Diagnostic Display 74 that shows the degree to which the portion of each trace shown in First Panel 70 resembles the First Median Trace 72. Immediately below First Median Trace 72 is Second Panel 76. Second Panel 76 displays ten traces that were acquired by a second non-axially oriented geophone at the same time the traces in the First Panel 70 were acquired by the first non-axially oriented geophone. Below Second Panel 76 is Second Median Trace 78 that has been created by selecting the median amplitudes for the group of traces shown in Second Panel 76 at each sampling interval. Immediately to the right of Second Panel 76 is Second Diagnostic Display 80 that shows the degree to which the portion of each trace in Second Panel 76 resembles the Second Median Trace 78.

Immediately to the right of First Diagnostic Display 74 is Third Panel 82. Third Panel 82 displays ten traces that were acquired by an axially oriented geophone at the same time the traces in the First Panel 70 were acquired. Below Third Panel 82 is Third Median Trace 84 that has been created by selecting the median amplitudes for the group of traces shown in Third Panel 82 at each sampling interval. Immediately below Third Median Trace 84 is Fourth Panel 86. Fourth Panel 86 displays ten traces that were acquired by a hydrophone at the same time the traces in the First Panel 70 were acquired. Below Fourth Panel 86 is Fourth Median Trace 88 that has been created by selecting the median amplitude of the group of traces shown in Fourth Panel 86 at each sampling interval.

An analysis of the traces in First Panel 70 and Second Panel 76 shows that there is a clearly identifiable change in tool orientation around the sixth trace from the top that changes the energy distribution between the two components transverse to the tool. The axial geophone measurements shown in the Third Panel 82 and the hydrophone measurements shown in the Fourth Panel 86 are not affected by this rotation. One reason for doing multiple recordings at a given depth is to increase the signal-to-noise ratio of the data by stacking. In the example shown in FIG. 3, it is clear that stacking the traces in the First Panel 70 and the Second Panel 76 will not increase the signal-to-noise ratio of the data.

This invention is based on the discovery that the drill collar containing the geophones may rotate during the collection of multiple traces at particular source and receiver locations and the observation that it is not necessary to know the absolute orientation of the tool to determine and/or correct for the rotation of the tool. The important thing is that the orientation of the "first-break" data vector be consistent on all traces within each gather of multiple traces recorded at a set depth before the data is combined. This orientation could be such that most of the energy falls on one of the transversal components, e.g. First Panel 70. The rotation operator to be applied to each trace may be determined using an energy alignment technique, such as the least squares method described below, by using orientation information from a gyroscope or other type of orientation sensor, or by appropriately combining these methods. After this rotation, the multiple data recordings in the gather may be stacked without loss of signal. An embodiment of this process has been broken down into component processes and is depicted in FIG. 1.

This process typically begins by determining a first approximate estimate of the direct arrival time. This is shown in FIG. 1 as the Pick Estimated Direct Arrival Time 14 process. The direct arrival time is the travel time that the source pulse takes to travel directly (in the least travel time sense) from the Seismic Source 60 to the seismic receivers. This first received pulse should be relatively free of reflected arrivals, converted wave arrivals, etc. The approximate direct arrival time picked at this point in the process is not required to be the best possible estimate of the true direct arrival time. Its purpose is to help identify a window (described below) that contains the true direct arrival time as well as sufficient acoustic energy to allow the processing procedure to appropriately align the energy in the windowed portion of the data along a common axis.

This estimated direct arrival time is typically picked by selecting an average first zero-crossing time from the hydrophone acquired data or by selecting an average first arrival maximum amplitude time from the axially oriented geophone acquired data. Preferably the approximate time pick is the median of the maximum of the sum of the envelopes of the three geophones (envelope$_x$+envelope$_y$+envelope$_z$) as picked on the individual recordings in the gather, to avoid sensitivity to well deviation and tool rotation effects. As noted below, a more accurate estimate of the direct arrival time can be determined by using a process that appropriately utilizes all of the geophone data, but the previously mentioned methods provide an estimated direct arrival time that is sufficiently accurate to be used in the inventive method. The estimated direct arrival time is shown in FIG. 3 as Arrival Time 90.

A windowed portion of each of the traces in First Panel 70 and Second Panel 76 is then selected in the Extract Windowed Portions of Non-Axially Oriented Geophone Acquired Data 16 process. The time window used for a least squares determination of the rotation operator will typically depend on the expected duration of the signal, which for a minimum phase signal is the inverse of the signal bandwidth. In the example data shown in FIG. 3, a window having a 20 milliseconds width was used. The window was not precisely centered about the Arrival Time 90 but was slightly shifted toward earlier times because the later the arrival time, the greater the likelihood that the signal will be contaminated by reflected arrivals, converted wave arrivals, etc. The beginning time of the window is shown as Window Beginning Time 92 and the ending time of the window is shown as Window Ending Time 94.

Assuming linear polarization of the first-break energy, the rotation operator $R(\theta)$:

$$R(\theta) = \begin{bmatrix} \cos\theta & \sin\theta \\ -\sin\theta & \cos\theta \end{bmatrix}, \quad (1)$$

that, when applied to the data, will align the energy along the First Panel 70 axis, is given by the expression:

$$R(a_1, a_2; \theta) = \frac{1}{\sqrt{a_1^2 + a_2^2}} \begin{bmatrix} a_1 & a_2 \\ -a_2 & a_1 \end{bmatrix}. \quad (2)$$

The quantities $a_j$ (j=1, 2) are given by:

$$a_j = \frac{\sum_{n=t-(1-x)\Delta}^{t+(1+x)\Delta} T_j(n) \cdot \sqrt{T_1(n)^2 + T_2(n)^2}}{\sum_{n=t-(1-x)\Delta}^{t+(1+x)\Delta} [T_1(n)^2 + T_2(n)^2]}, \quad j = 1, 2. \quad (3)$$

where t is the Arrival Time, $\Delta$ is one half of the window width, and x is a value between 0 and 1 that indicates the amount that the window has been shifted toward earlier arrival times. Because the energy received after the first arrival may contain reflected arrivals or other types of signals that would be noise for purposes of this calculation, it is preferable to shift the window so that a majority portion of the window (perhaps 60 or 75%) is positioned before the estimated first arrival time (as shown in FIG. 3 and provided the estimated first arrival time is determined in the manner discussed above). The determination of the rotational operators, R, for each corresponding pair of traces in First Panel 70 and Second Panel 76 is shown in FIG. 1 as the Determine Rotation Operators 18 process.

One issue to pay attention to while determining the rotational operators is the phase of the maximum energy output pulses. Using the above method, it is possible to determine rotational operators that produce maximum energy output pulses that are either in phase with the previous maximum energy output pulses or are 180 degrees out of phase with respect to the previous maximum energy output pulses. Various alternative types of correlation procedures may be used to determine if the maximum energy output pulses are in phase or out of phase. Perhaps the simplest method is to simply add the pulses together and determine if the summed pulse has more energy than either of the input pulses (i.e. the input pulses are in phase) or the sum has less energy than either of the input pulses (i.e. the input pulses are out of phase). If it is determined that the pulses are out of phase, the rotation operator used to produce one of the traces should be rotated by 180 degrees.

If orientation information from a gyroscope or other type of orientation sensor is available, the coefficients of rotation operator R may be calculated directly from this information. Preferably, this orientation data is used to calculate preliminary rotation operator coefficients and an energy alignment technique; such as the least squares method described above is used to verify that the presumed orientation is consistent with the received seismic measurement-while-drilling data.

The rotation angles associated with each rotation operator R can also be determined from the coefficients of the rotation operators and transmitted to the surface, stored for later retrieval, and/or used during the processing of data from associated sensing or measuring equipment, such as electromagnetic, nuclear, nuclear magnetic resonance, or acoustic measuring devices, as discussed below.

These rotation operators are then typically applied to the entire trace (i.e. both the initial arrival portion shown in FIG. 3 as well as the data that arrived later in time). This is shown in FIG. 1 as the Apply Rotation Operators to Non-Axially Oriented Geophone Acquired Data 20 process. The transformed transverse components $T_1'$ and $T_2'$ become:

$$\begin{pmatrix} T_1' \\ T_2' \end{pmatrix} = R \begin{pmatrix} T_1 \\ T_2 \end{pmatrix}. \quad (4)$$

Figure 4:
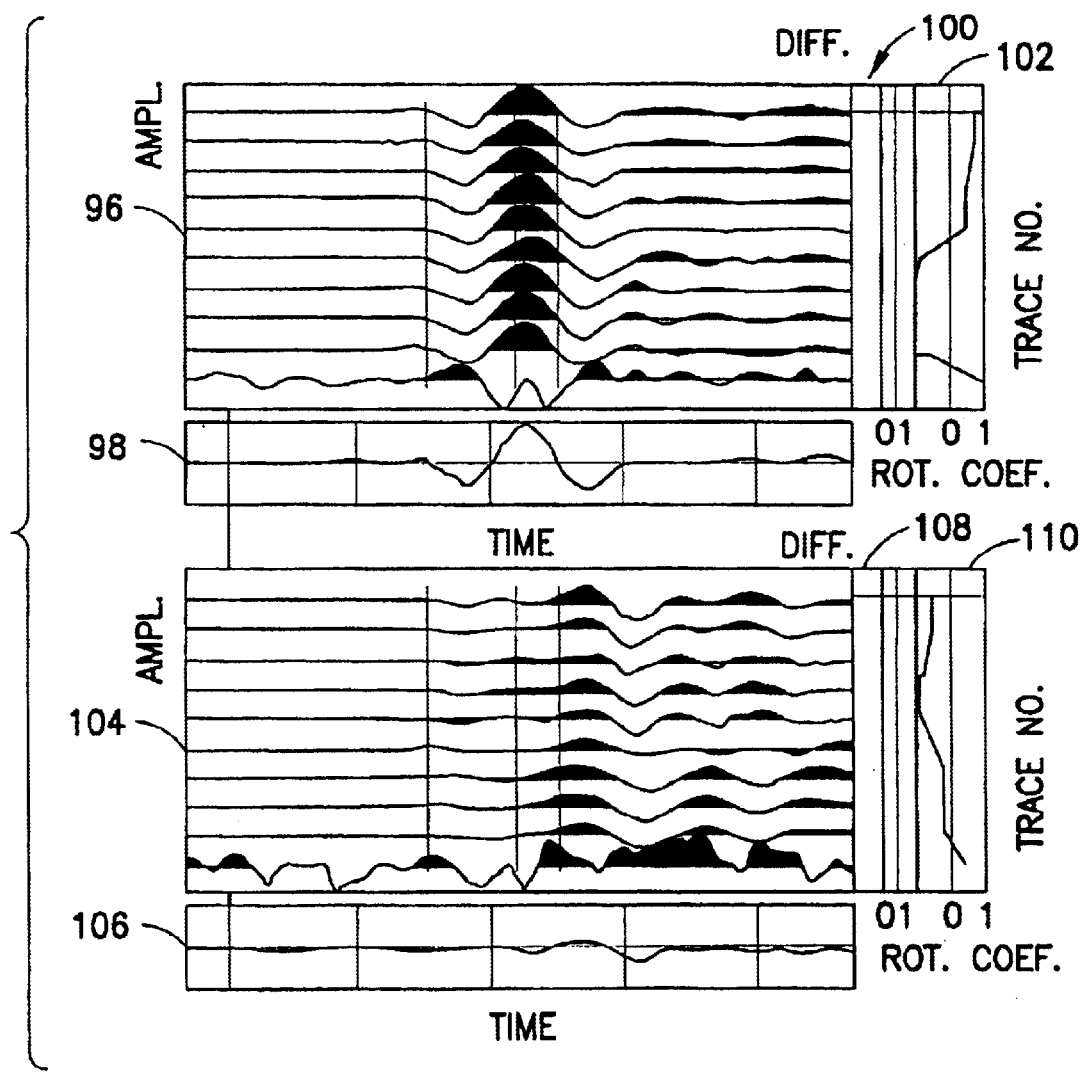
FIG. 4 displays rotated and combined multi-component seismic measurement-while-drilling data processed in accordance with an embodiment of the inventive method.

FIG. 4 shows the result obtained by rotating the data shown in First Panel 70 and Second Panel 76 so that the maximum energy within the window around the first break falls on the First Panel 70 component and the minimum energy around the first break falls on the Second Panel 76 component. Fifth Panel 96 displays the same approximately 100-millisecond portion of the rotated traces that was shown in the First Panel 70, but a maximum quantity of energy now resides in these traces. Similarly Sixth Panel 104 displays the same approximately 100-millisecond portion of these traces that was shown in the Second Panel 76, but a minimum quantity of energy now resides in these traces.

After the rotation, each set of traces can now be stacked without loss of signal. The tenth recordings in the Fifth Panel 96 and the Sixth Panel 104 clearly have problems and should be excluded from subsequent stacking. Using the median as an estimate of the stacked trace, one way of reducing the influence of badly measured traces on this estimate is by first finding a preliminary median trace, then excluding traces that deviate more than a set amount from the median, before finding the final median trace. This is shown in FIG. 1 as the Combine rotated data 22 process.

Below Fifth Panel 96 is Fifth Median Trace 98 that has been created by selecting the median amplitudes for the group of traces shown in Fifth Panel 96 at each sampling interval. Immediately to the right of Fifth Panel 96 is Fifth Diagnostic Display 100 that shows that each trace in Fifth Panel 96 closely resembles the Fifth Median Trace 98. Immediately to the right of Fifth Diagnostic Display 100 is Fifth Rotation Coefficient Display 102 that displays the rotation coefficient applied to the corresponding trace in First Panel 70

$$\left( \cos\theta = \frac{a_1}{\sqrt{a_1^2 + a_2^2}} \right).$$

Immediately below Sixth Panel 104 is Sixth Median Trace 106 that has been created by selecting the median amplitudes for the group of traces shown in Sixth Panel 104 at each sampling interval. Immediately to the right of Sixth Panel 104 is Sixth Diagnostic Display 108 that shows that each trace in Sixth Panel 104 closely resembles the Sixth Median Trace 106. Immediately to the right of Sixth Diagnostic Display 108 is Sixth Rotation Coefficient Display 110 that displays the rotation coefficient applied to the corresponding trace in Second Panel 76

$$\left(\sin\theta = \frac{a_2}{\sqrt{a_1^2 + a_2^2}}\right).$$

The entire dataset obtained at this particular source and receiver locations has now incorporated into the following: for the hydrophone acquired data—Fourth Median Trace 88; for the axially oriented geophone acquired data—Third Median Trace 84; for the non-axially oriented geophone acquired data—Fifth Median Trace 98 and Sixth Median Trace 106. These data (including the portions of the traces that follow the 100 millisecond window displayed in FIGS. 3 and 4) as well as any desired diagnostic information, captures all of value of the data from each of the ten traces acquired by each seismic sensor for this source location and receiver location pair. One significant advantage of the inventive method is that it allows multiple recordings acquired at particular source and receiver locations to be compressed into a single recording downhole, thereby reducing the quantity of data that must be stored downhole and/or transmitted to the surface.

The combined rotated non-axially oriented geophone acquired data can be stored, typically by using a recording device located within Drill Collar 54, and later retrieved, either using a while-drilling data telemetry system or when the Drill Collar 54 is raised to the surface. This is shown in FIG. 1 as the Store rotated data 24 process and the Retrieve rotated data 26 process.

Figure 5:
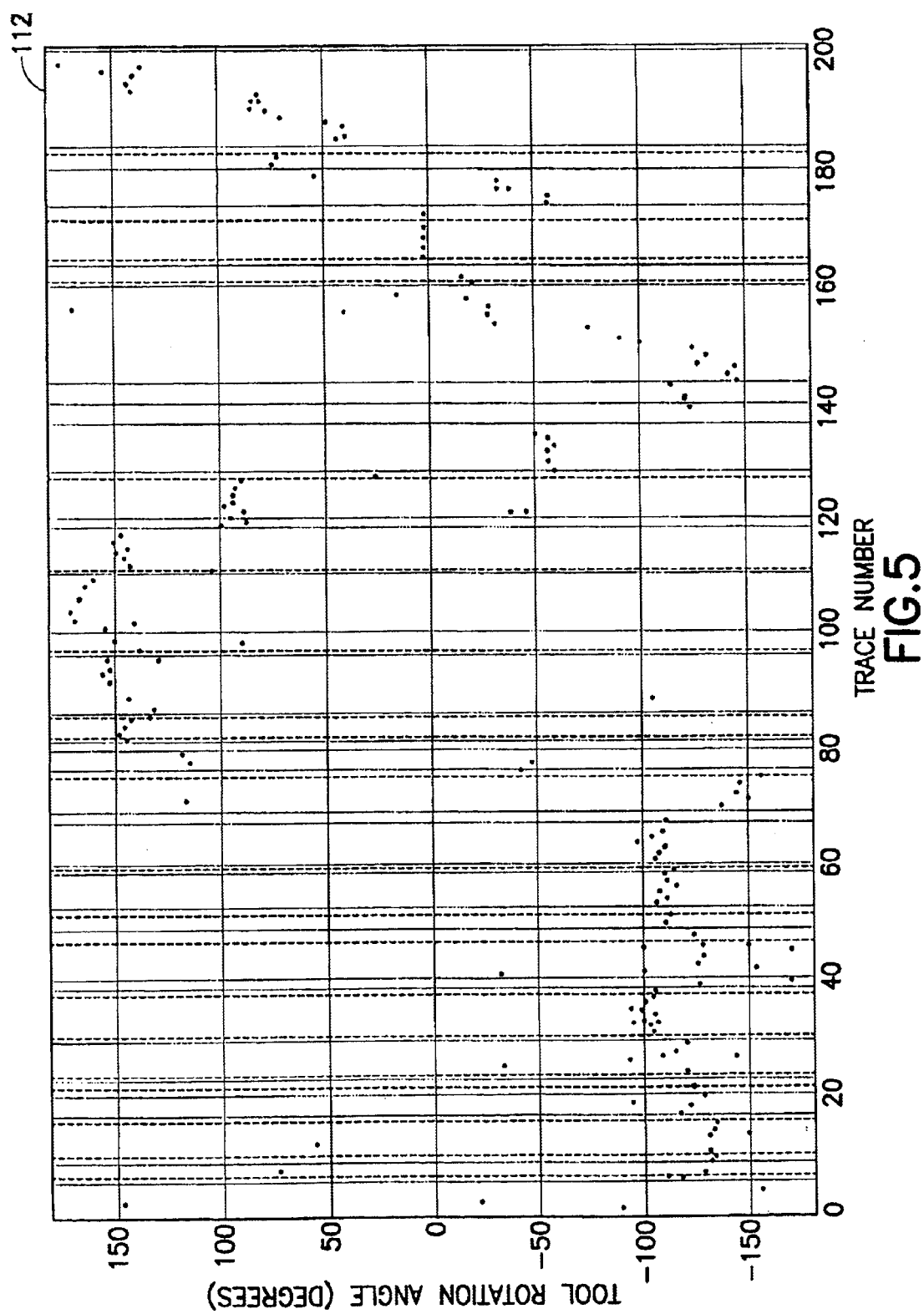
FIG. 5 displays estimated tool rotation angle versus trace number for an example multi-component seismic measurement-while-drilling dataset.

The dataset used in FIG. 3 consisted of a total of about 200 good-quality recordings, on the average 10 recordings per tool setting. The orientation information from the rotation operator R for each of the good traces has been stored and transmitted to the surface. This is shown in FIG. 1 as the Store orientation information 40 process. In FIG. 5, Rotation Angle Display 112 shows the vector rotation angles determined using the technique described above for each group of the individual recordings. This is an example result of the Display orientation information 42 process. The solid vertical lines separate the different tool settings. For some settings there are substantial slippage, in particular, for the tool settings centered around trace 157 and trace 192, there is a gradual slippage of about 120°. The data records shown in FIG. 3 are centered at around trace 179 in FIG. 5 and are seen to have a gradual slippage (or possibly two or three separate groups) of tool orientations, spread over an interval of about 140°. In addition to absolute orientations, the inventive method may additionally or alternatively determine changes in orientation of the bottom hole assembly. These orientations and/or changes in orientation of the bottom hole assembly may be used in the processing of measurements obtained by other tools incorporated within the bottom hole assembly. This is shown in FIG. 1 as the Use orientation information to process non-seismic data 44 process. Data from devices such as electromagnetic, nuclear, nuclear magnetic resonance, or acoustic measuring tools may be used in this process.

The well deviation is 45° for the well for which the data shown in FIG. 3 was collected. The inclination of the well affects the amplitude of compressional energy recorded on the axially oriented geophone. For a perfectly horizontal well and a seismic source located directly above the sensors, the axially oriented geophone will see no direct compressional energy. This makes a second data rotation desirable for strongly deviated or horizontal wells. This rotation is very similar to the one described above, but now involves rotating the data vector around the least energetic axis in order to put most of the first-break energy into only one of the three axis. This process is broken down into subcomponent processes shown in FIG. 1.

This process typically begins by appropriately combining all of the data acquired by the axially oriented geophone at the given source and receiver locations. This process is shown in FIG. 1 as the Combine Axially Oriented Geophone Acquired Data 28 process and will typically comprise using a median estimate to reject bad traces and then creating a median trace by selecting, point-by-point, the median amplitudes of the remaining traces at each sampling interval, as described above. This trace and the combined rotated maximum energy trace (shown in FIG. 6 as Fifth Median Trace 98 and Third Median Trace 84) are then subjected to a Extract Windowed Portions of Combined Axially Oriented Geophone Acquired Data and Maximum Energy Combined Rotated Non-Axially Oriented Geophone Acquired Data 30 process, like the Extract Windowed Portions 16 process described above. These extracted portions are used to derive a rotation operator in the Determine Rotation Operator to Align Energy in Axially Oriented and Maximum Energy Non-Axially Oriented Geophone Acquired Data 32 process, like the Determine Rotation Operators 18 process described above. The rotation operator is applied to the entire portion of both of the input traces in the Apply Rotation Operator to Axially Oriented and Maximum Energy Non-Axially Oriented Data 34 process, like the Apply Rotation Operators 20 process described above. This process could alternatively be performed on the unstacked traces, but this is unnecessary because the orientation of the traces acquired by the axially oriented geophone with respect to the maximum energy traces from the non-axially oriented geophones do not change trace to trace.

Figure 6:
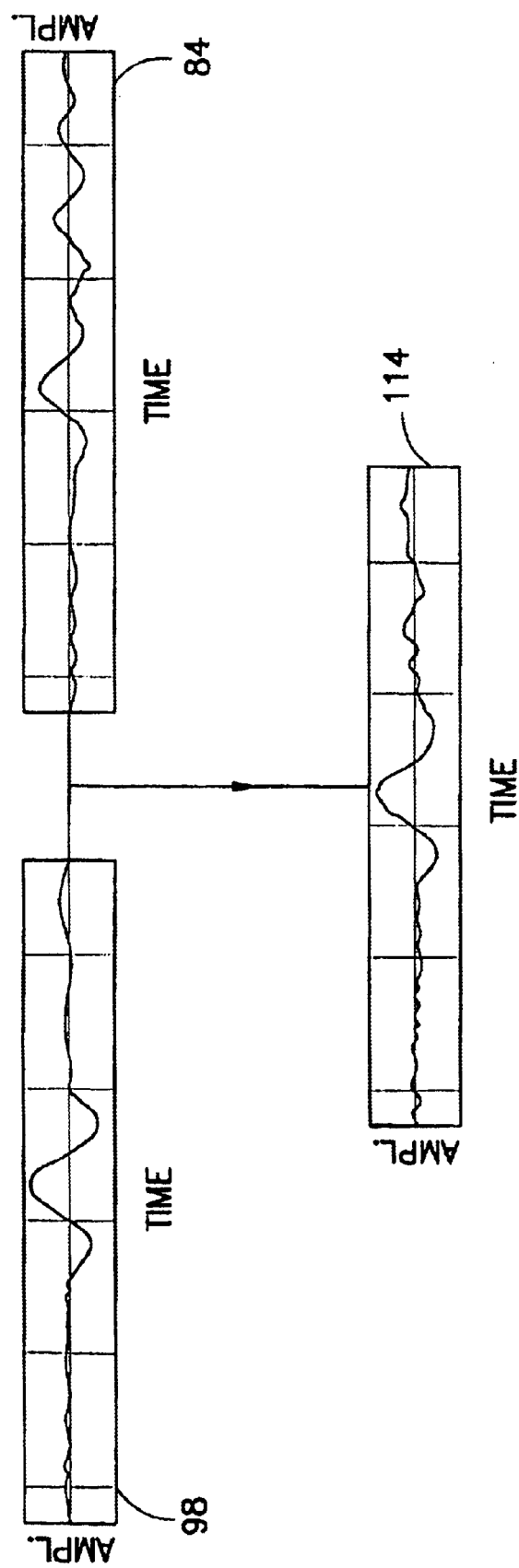
FIG. 6 displays further rotated multi-component seismic measurement-while-drilling data processed in accordance with a further embodiment of the inventive method.

FIG. 6 shows the type of data that can be output from this rotation process. Maximum Geophone Energy Trace 114 depicts an approximately 100-millisecond portion of a maximum energy output trace that may be produced using this type of process. This trace shows expected results of rotating the non-axially oriented geophone acquired data gathers in FIG. 3 around the now low-energy $2^{nd}$ component and then putting as much as possible of the first-arrival energy into the $3^{rd}$ component. A final arrival time can now be picked from this trace in the Pick Arrival Time From Rotated Maximum Energy Data 36 process and this arrival time can be transmitted to the surface (such as by using an acoustic or mud pulse data telemetry system) in the Transmit Arrival Time To Surface 38 process. The maximum energy trace will have a clearly higher signal-to-noise ratio than any of the other geophone acquired seismic data, thereby improving the reliability of the break-time picks. For larger well deviations, the benefit from performing this second rotation will be even more important and will be crucial for horizontal wells. The hydrophone acquired data shown in the Fourth Panel 86 or Fourth Median Trace 88 may also be used in the process of determining the most appropriate direct arrival time.

While the invention has been described herein with reference to certain examples and embodiments, it will be evident that various modifications and changes may be made to the embodiments described above without departing from the scope of the invention as set forth in the following claims.

I claim:

1. A method of processing multi-component seismic measurement-while-drilling data, comprising:

rotating said multi-component seismic measurement-while-drilling data to align energy in said data along a common axis; and then combining said multi-component seismic measurement-while-drilling data.

2. A method of processing multi-component seismic measurement-while-drilling data according to claim 1, wherein said rotating and combining is performed downhole.

3. A method of processing multi-component seismic measurement-while-drilling data according to claim 2, wherein said combined multi-component seismic measurement-while-drilling data is transmitted uphole using an acoustic or mud pulse telemetry system.

4. A method of processing multi-component seismic measurement-while-drilling data according to claim 1, wherein a rotation operator is determined using a windowed portion of said multi-component seismic measurement-while-drilling data.

5. A method of processing multi-component seismic measurement-while-drilling data according to claim 4, wherein the width of said window is approximately the inverse of the signal bandwidth.

6. A method of processing multi-component seismic measurement-while-drilling data according to claim 1, wherein said rotated multi-component seismic measurement-while-drilling data has been acquired using a pair of non-axially oriented geophones.

7. A method of processing multi-component seismic measurement-while-drilling data according to claim 6, further including further rotating said rotated and combined multi-component seismic measurement-while-drilling data with combined multi-component seismic measurement-while-drilling data acquired using an axially oriented geophone.

8. A method of processing multi-component seismic measurement-while-drilling data according to claim 7, further including picking an arrival time from said further rotated multi-component seismic measurement-while-drilling data.

9. A method of processing multi-component seismic measurement-while-drilling data according to claim 8, further including transmitting said arrival time uphole.

10. A method of processing multi-component seismic measurement-while-drilling data according to claim 1, wherein said combining comprises creating a median trace.

11. A method of processing multi-component seismic measurement-while-drilling data according to claim 10, wherein a preliminary median trace is found and any trace that deviates more than a set amount from said preliminary median trace is excluded before the median trace is created.

12. A method of estimating the orientations and/or change in orientation of a bottom hole assembly, comprising:
   determining rotation operators that align energy in two or more series of multi-component seismic measurement-while-drilling data acquired using said bottom hole assembly; and
   estimating the orientations and/or change in orientation of said bottom hole assembly from said rotation operators.

13. A method of estimating the orientations and/or change in orientation of a bottom hole assembly according to claim 12, further comprising displaying said orientations and/or change in orientation.

14. A method of processing measurement-while-drilling data acquired by a tool forming part of a bottom hole assembly, comprising:
   determining rotation operators that align energy in two or more series of multi-component seismic measurement-while-drilling data acquired using said bottom hole assembly;
   estimating the orientations and/or change in orientation of said bottom hole assembly from said rotation operators; and
   using said orientations and/or change in orientation to process measurements obtained by said tool.

15. A method of processing measurement-while-drilling data acquired by a tool forming part of a bottom hole assembly according to claim 14, wherein said tool comprises an electromagnetic, nuclear, nuclear magnetic resonance, or acoustic measuring device.

* * * * *